United States Patent [19]

Spies et al.

[11] Patent Number: 4,950,915
[45] Date of Patent: Aug. 21, 1990

[54] IMPACT SENSOR WITH A TESTING CIRCUIT FOR A VEHICLE

[75] Inventors: Hans Spies, Pfaffenhofen; Horst Laucht, Bruckmuehl; Alfons Woehrl, Schrobenhausen, all of Fed. Rep. of Germany

[73] Assignee: Messerschmitt-Boelkow-Blohm GmbH, Munich, Fed. Rep. of Germany

[21] Appl. No.: 272,776
[22] PCT Filed: Mar. 3, 1988
[86] PCT No.: PCT/EP88/00161
§ 371 Date: Oct. 25, 1988
§ 102(e) Date: Oct. 25, 1988
[87] PCT Pub. No.: WO88/06541
PCT Pub. Date: Sep. 7, 1988

[30] Foreign Application Priority Data
Mar. 3, 1987 [DE] Fed. Rep. of Germany ....... 3706765

[51] Int. Cl.⁵ ............................................. B60R 21/00
[52] U.S. Cl. .................................. 307/10.1; 340/436; 340/515; 340/669; 280/735; 180/282; 73/1 B
[58] Field of Search ..................... 307/9.1, 10.1, 120, 307/121; 324/500, 501, 503, 527, 56; 340/436, 437, 514, 515, 516, 653, 669, 438, 683; 280/734, 735, 806; 180/268, 274, 282, 271; 310/314, 318, 334, 338; 73/1 D, 1 R, 1 B, 1 DV, 865.9

[56] References Cited

U.S. PATENT DOCUMENTS 3,851,305 11/1974 Baba et al. .......................... 340/669
3,870,894 3/1975 Brede et al. .......................... 307/9.1
3,956,731 5/1976 Lewis, Jr. ......................... 340/516 X
4,243,971 1/1981 Suchowerskyj et al. ....... 340/516 X
4,346,914 8/1982 Livers et al. ......................... 280/735
4,386,343 5/1983 Shively ................................. 340/566
4,620,446 11/1986 Jensen et al. ........................... 73/652

FOREIGN PATENT DOCUMENTS 2207831 8/1973 Fed. Rep. of Germany .
2808872 9/1979 Fed. Rep. of Germany .

OTHER PUBLICATIONS

Advances in Instrumentation, vol. 27, Part 2, M. H. Woodward, pp. 620/1–620/9.
Proceedings of the 27th Annual ISA Conference, New York, Oct. 9–12, 1972, Instrument Society of America.

*Primary Examiner*—A. D. Pellinen
*Assistant Examiner*—David Osborn
*Attorney, Agent, or Firm*—W. G. Fasse; D. H. Kane, Jr.

[57] ABSTRACT

An impact sensor (1) for a vehicle is connected to a testing circuit. The impact sensor includes an acceleration sensor (5), an evaluating circuit (6) and a trigger circuit (7) for a passive safety device. For simply testing the operability of the impact sensor an electro-acoustic transducer (9) is arranged in a sensor housing (2). The transducer (9) emits a testing signal that is received by the acceleration sensor (5). The electrical signals which are produced by the acceleration sensor are tested by the testing circuit (10) which is part of the evaluating and trigger circuit. The testing is performed with reference to given criteria.

7 Claims, 2 Drawing Sheets

ACOUSTIC TESTING SIGNAL
RADIATED BY TRANSDUCER 9

ELECTRIC SIGNAL FROM
ACCELERATION SENSOR 5

IMPACT SENSOR WITH A TESTING CIRCUIT FOR A VEHICLE

FIELD OF THE INVENTION

The invention relates to an impact sensor with a testing circuit for a vehicle.

BACKGROUND OF THE INVENTION

Such an impact sensor is known from German Patent Publication DE-OS 2,207,831. The impact sensor is arranged in a sensor housing and serves for triggering a passive safety device when the vehicle impacts on an obstacle. The triggering of the safety device involves, for example, inflating an air cushion or the pulling tight of a safety belt. In the sensor housing there are arranged an acceleration sensor, an evaluating circuit for the electrical output signals thereof, a trigger circuit for triggering the passive safety device and a testing circuit for testing the ability of the impact sensor to function. The testing circuit produces an impulse train, whereby the impulse amplitudes are so dimensioned that in the evaluating and triggering circuit given threshold values can be checked. The testing impulses are caused to pass through the entire circuit and they are evaluated in the testing circuit. During the testing of the impact sensor to see whether it is able to function, the trigger circuit is separated from the passive safety device.

In the known sensor the acceleration system is a piezoelectric crystal, the signal of which are integrated once or twice depending on whether the triggering criterium is selected as a certain critical speed or a certain critical distance. The mentioned testing impulses are thereby directly applied to the electrodes of the piezoelectric crystal. The testing circuit is switched on at least prior to the beginning of a trip and preferably also at regular time intervals during the trip. The ability to function can be indicated, for example optically. For example, a light emitting diode could blink for a certain time after starting during the operation of the ignition of the vehicle. The diode could extinguish when the sensor is functional. If, during a testing it is ascertained that the sensor is not functioning properly, then, for example, a continuous blinking could be triggered.

In the known testing circuit only the electrical and electronic components of the impact sensor are tested. A further testing, for example, of a mechanical type is not provided.

OBJECT OF THE INVENTION

The invention has for its object to simplify the testing of the impact sensor and to provide a simple indication of the ability to function properly or of the disablement.

SUMMARY OF THE INVENTION

According to the invention an electro-acoustic transducer is provided in the sensor housing. The transducer is coupled with the acceleration sensor acoustically. Preferably, the coupling takes place through the sensor housing. The testing of the trigger circuit can be called an acoustical testing. The disclosed acoustical testing has several advantages. Prior to beginning a trip with the vehicle, the electro-acoustic transducer is switched-on with switching-on the ignition, whereby the transducer operates intermittently, for example, in synchronism with the above mentioned light emitting diode, to emit a characteristic testing signal. The vibrations of the testing signal of the electro-acoustic transducer are transmitted either directly or through the sensor housing to the piezoelectric acceleration sensor. This sensor provides, in response to the testing signal, a signal which is passed through the evaluation and trigger circuit and the processing of which is tested by the testing circuit. Additionally, the frequency characteristic of the testing signal emitted by the electro-acoustic transducer can be tested in the testing circuit. Based on such a testing, a conclusion can be made, for example, whether the sensor housing is mechanically rigidly connected to the supporting structure of the motor vehicle.

The electro-acoustical transducer preferably radiates the testing signal oscillations in the audible range so that the ability of the impact sensor to function can be signalled acoustically in addition to an optical indication. In case the impace sensor is disabled, it is possible, for example, to leave the electro-acoustical transducer switched on so that the driver of the vehicle is alerted, for example, if the mounting of the sensor housing has become loose. This becomes noticeable also acoustically due to the vibrating of other components due to the looseness. For example, a wall of the sensor housing may serve for amplifying the acoustical testing signal of the electro-acoustical transducer. For this purpose the sensor housing wall is constructed as a sound membrane in a suitable wall portion.

The characteristic testing signals of the electro-acoustical transducer can serve as transmission signals for a further indication, for example, the mentioned optical indication. A part of the characteristic testing signals of the transducer is then within the ultrasonic frequency range. At the end of the transmission range respective transducers must be provided, for example, acoustical transducers or light transducers, which do not require electrical cables. Hence, these electrical cables are saved in such an embodiment.

The described testing of the ability of the acceleration sensor to function and the function indication of the entire impact sensor, with an electro-acoustical transducer and an acoustical self testing of the impact sensor are especially then of advantage when the sensor housing with the acceleration sensor, the evaluation and trigger circuit, as well as the testing circuit, are arranged directly in the steering wheel of the vehicle.

BRIEF DESCRIPTION OF THE DRAWINGS

The invention is described in more detail with regard to an example embodiment shown in the accompanying drawings, wherein.

DETAILED DESCRIPTION OF PREFERRED EXAMPLE EMBODIMENTS AND OF THE BEST MODE OF THE INVENTION

Figure 1:
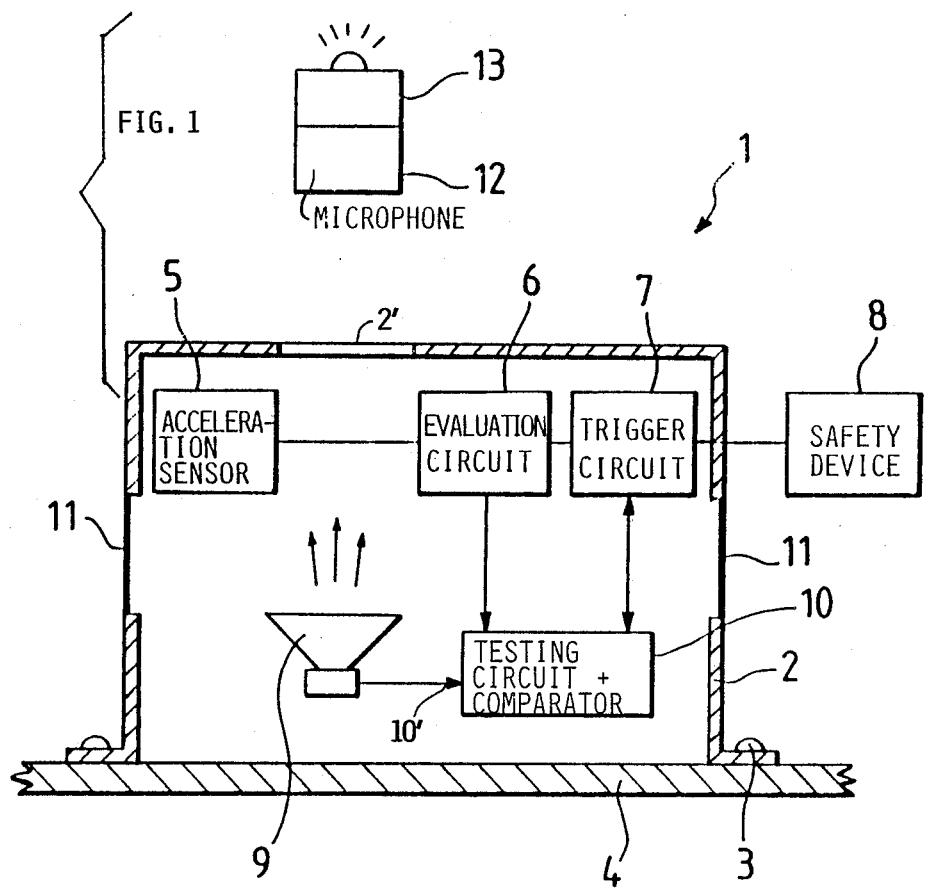
FIG. 1 shows schematically and in block form the construction of an impact sensor according to the invention.
Figure 2:
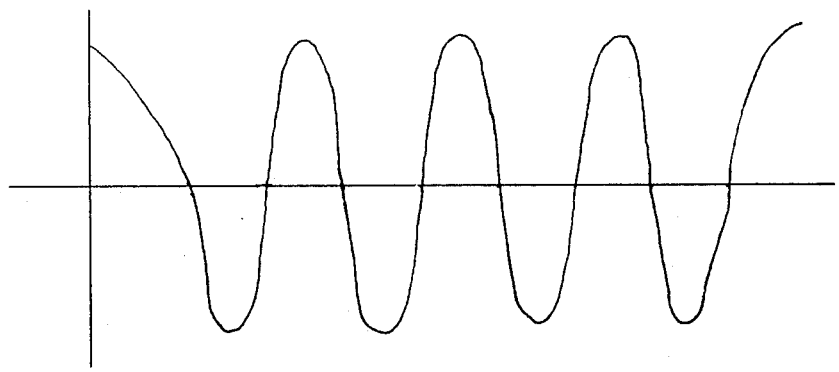
FIG. 2 shows symbolically a characteristic acoustic testing signal.
Figure 3:
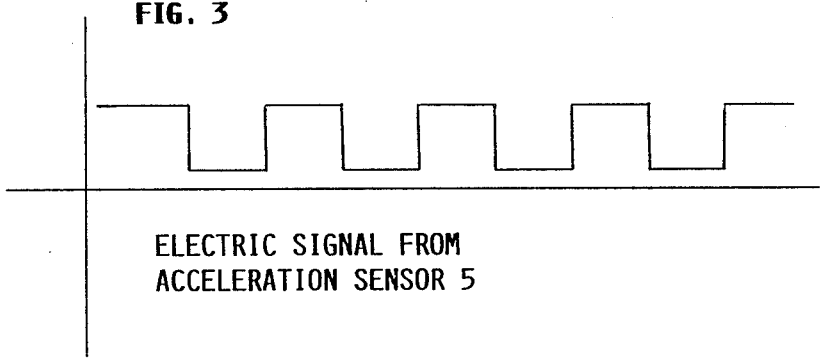
FIG. 3 shows symbolically an electrical output signal of the acceleration sensor.

An impact sensor 1 is arranged in a sensor housing 2 which is connected by a mounting device 3 to a member 4 of a vehicle chassis. In the sensor housing 2 there are provided an acceleration sensor 5, an evaluating circuit 6 for the electrical signals provided by the acceleration sensor 5, and a trigger circuit 7. The trigger circuit 7 triggers a passive safety device 8 when the evaluated signals exceed a critical threshold value. The safety device 8 may be an air bag or a safety belt, for example. Further, an electro-acoustical transducer 9 is provided in the sensor housing. The transducer 9 may be constructed as a piezo-mechanic transducer and emits a characteristic testing signal shown in FIG. 2. A testing circuit 10 in the sensor housing is connected with its testing input 10' to an output of the transducer 9 to supply the characteristic testing signal from the transducer 9 to the testing circuit 10 for a testing operation. Portions of the walls of the sensor housing to are constructed as sound membranes 11 in different zones of the housing for an improved transmission of the characteristic testing signal from the transducer 9 to the outside. Additionally, the electro-acoustic transducer 9 may radiate onto a microphone 12 located outside of the housing, through an opening 2' in a wall of the housing 2. The output signals of the microphone 12 are used for activating of an optical indicator 13 for showing that the transducer 9 operates to perform its testing function.

The signals of the electro-acoustical transducer 9 may be transmitted to the testing circuit 10 acoustically or electrically. The output signals of the evaluating circuit 6 and of the trigger circuit 7 are supplied to the testing circuit 10 which compares these signals with given characteristic acoustic testing signals whereby the testing circuit 10 functions as a comparator. During the testing procedure the trigger circuit 7 is separated from the safety device 8.

The testing of the impact sensor may even take place during an impact of a vehicle on an obstacle because the acoustic testing signal can be selected to be distinctly different from noise signals generated by an impact.

Although the invention has been described with reference to specific example embodiments it will be appreciated that it is intended to cover all modifications and equivalents within the scope of the appended claims.

We claim:

1. An impact sensor device for a vehicle, comprising a sensor housing, an acceleration sensor arranged in said sensor housing, an evaluating circuit connected to said acceleration sensor for evaluating electrical output signals from said acceleration sensor, a trigger circuit connected to said evaluation circuit for triggering a passive safety device when a given threshold value is exceeded, a testing circuit for testing the operability of said impact sensor device, electro-acoustic transducer means arranged in said sensor housing as part of said testing circuit, said electro-acoustic transducer means being acoustically coupled to said acceleration sensor for applying a characteristic acoustic testing signal to said acceleration sensor, and wherein said testing circuit compares said characteristic acoustic testing signal of said electro-acoustic transducer means with signals from said acceleration sensor for ascertaining the operability of said impact sensor device.

2. The sensor device of claim 1, wherein said electro-acoustic transducer means (9) is acoustically coupled to said acceleration sensor (5) by walls of said sensor housing so that vibrations of said electro-acoustic transducer are transmitted to said sensor (5) by said housing walls.

3. The sensor device of claim 1, wherein said electro-acoustical transducer means (9) also radiates signals in the audible range.

4. The sensor device of claim 1, wherein a portion of said sensor housing (2) is constructed as a sound membrane (11) for said electro-acoustical transducer.

5. The sensor device of claim 1, wherein said electro-acoustic transducer means (9) is coupled with an optical indication means (13).

6. The sensor device of claim 1, further comprising means for disconnecting said trigger circuit (7) from the passive safety device when said evaluating circuit and said trigger circuit fail to function.

7. The sensor device of claim 1, wherein said characteristic acoustic testing signal is distinct from any noise signal generated by an impact, so that acoustic testing of said impact sensor can take place also during an impact of the vehicle on an obstacle.

* * * * *